United States Patent [19]
Mikami et al.

[11] Patent Number: 5,634,869
[45] Date of Patent: Jun. 3, 1997

[54] SHIFT CONTROL SYSTEM FOR AUTOMATIC TRANSMISSION

[75] Inventors: Tsuyoshi Mikami, Toyota; Hidehiro Oba, Numazu; Nobuaki Takahashi, Toyota, all of Japan

[73] Assignee: Toyota Jidosha Kabushiki Kaisha, Toyota, Japan

[21] Appl. No.: 606,857

[22] Filed: Feb. 26, 1996

[30] Foreign Application Priority Data

Mar. 3, 1995 [JP] Japan ................... 7-070672

[51] Int. Cl.⁶ .................. F16H 61/06; F02D 29/00
[52] U.S. Cl. ............. 477/154; 475/120; 477/109
[58] Field of Search ................... 477/109, 154; 475/120

[56] References Cited

U.S. PATENT DOCUMENTS

| | | | |
|---|---|---|---|
| 4,662,488 | 5/1987 | Hiramatsu et al. | 477/154 |
| 4,955,256 | 9/1990 | Kashihara et al. | 477/154 |
| 5,014,573 | 5/1991 | Hunter et al. | 477/154 |
| 5,072,390 | 12/1991 | Lentz et al. | 477/154 |
| 5,335,567 | 8/1994 | Seidel et al. | 475/120 |
| 5,383,820 | 1/1995 | Mori | 477/154 |
| 5,401,219 | 3/1995 | Kimura et al. | 475/120 |

FOREIGN PATENT DOCUMENTS

| | | |
|---|---|---|
| 62-261747 | 11/1987 | Japan . |
| 4-368235 | 12/1992 | Japan . |
| 6-341525 | 12/1994 | Japan . |

*Primary Examiner*—Dirk Wright
*Attorney, Agent, or Firm*—Oblon, Spivak, McClelland, Maier & Neustadt, P.C.

[57] ABSTRACT

A shift control system can perform clutch-to-clutch shifts without occurrence of delay in shifting operation and aggravation of shift shock, by decreasing an engaging force of a first frictional engagement device and increasing an engaging force of a second frictional engagement device, and comprises a low pressure retention instructer for maintaining the second frictional engagement device at a predetermined low level until a revolution speed of a rotary member reaches a predetermined value upon the shift, an engagement instructer for increasing the engaging force of the second frictional engagement device after the revolution speed of the rotary member has reached said predetermined value, and a pressure rise instructer for increasing the engaging force of the first frictional engagement device after increasing the engaging force of the second frictional engagement device.

8 Claims, 7 Drawing Sheets

FIG. 4

|       | C0 | C1 | C2 | B0 | B1 | B2 | B3 | B4 | F0 | F1 | F2 |
|-------|----|----|----|----|----|----|----|----|----|----|----|
| N     |    |    |    | ◌  |    |    |    |    |    |    |    |
| REV.  |    |    | ○  | ○  |    |    |    | ○  |    |    |    |
| 1ST   | ○  | ○  |    |    |    |    |    | ●  | ○  |    | ○  |
| 2ND   | ●  | ○  |    |    |    |    | ○  |    | ○  |    |    |
| 3RD   | ○  | ○  |    |    | ●  | ○  |    |    | ○  | ○  |    |
| 4TH   | ○  | ○  | ○  |    |    | △  |    |    | ○  |    |    |
| 5TH   |    | ○  | ○  | ○  |    | △  |    |    |    |    |    |

SHIFT CONTROL SYSTEM FOR AUTOMATIC TRANSMISSION

BACKGROUND OF THE INVENTION

1. Field of the Invention

This invention relates to a shift control system for an automatic transmission of a vehicle, and more particularly to a control system for controlling a so-called clutch-to-clutch shift in which one of two frictional engagement means such as a clutch, a brake and the like is released while the other frictional engagement means is applied.

2. Related Art

As is known in conventional automatic transmissions of vehicles, shifts between one gear stage and another gear stage are facilitated by engaging a one-way clutch for the gear stage to be set. However, since the automatic transmission having such a construction inevitably necessitates to incorporate the one-way clutch therein, there occurs an inconvenience that the automatic transmission becomes large in size. Therefore, the automatic transmission has been recently constructed by a gear shifting device only without the one-way clutch. In the automatic transmission of this type, it is required to conduct a so-called clutch-to-clutch shift, in which two frictional engagement means are simultaneously switched between engaged and disengaged states, to set a given gear stage.

In case the clutch-to-clutch shift is conducted, if the two frictional engagement means are both in a released condition, it is likely to cause undesirable racing of the engine. To the contrary, when both the engaging forces of these frictional engagement means becomes excessively large, there occurs a so-called tie-up condition, which results in considerably decreasing an output shaft torque. Moreover, in case rotational fluctuation is caused so slowly to prevent a shift shock, it takes a long time to accomplish the shift operation so that a so-called delayed response occurs.

Thus, the engaging forces of the frictional engagement means concerned in the clutch-to-clutch shift, give a considerable influence on the vehicle attitude, and must be therefore controlled while taking into account a mutual relation therebetween. In this regard, for example, JP-A-62-261,747 discloses a control system which is so constructed that, when the clutch-to-clutch shift is made, one frictional engagement means on an applied side is maintained in the condition able to engage immediately while the other frictional engagement means on a released side is controlled in its engaging force, whereby an input R.P.M. is caused to be varied at a first changing rate at an initial stage followed by a next stage in which the input R.P.M. is caused to be varied at a second changing rate, and a final stage in which the frictional engagement means on the applied side is completely engaged when the input R.P.M. reaches a synchronous revolution speed of the gear stage to be established after the shift.

In the control system disclosed in the JP-A-62-261,747, the control for smoothly changing the input R.P.M. is effected only by controlling the engaging force of the frictional engagement means on the released side. In consequence, the control of the input R.P.M. can be performed without delay as compared with the control system of such a type that both the frictional engagement means must be simultaneously controlled. In addition, since the input R.P.M. is caused to be varied smoothly, occurrence of the shift shock is improved.

In the aforementioned conventional control systems, only the frictional engagement means on the released side is substantially controlled upon the clutch-to-clutch shift. This is advantageous for preventing the delayed shift control. However, it is required to perform the control of the engaging force of the frictional engagement means on the released side by taking into consideration the change in the input R.P.M. In other words, the engaging force of the frictional engagement means on the released side must be controlled while detecting the change in the input R.P.M., so that the shift delay can be improved only in a limited manner.

Moreover, the aforementioned conventional control systems are so constructed that the engaging forces of the respective frictional engagement means are controlled only relative to the input R.P.M. Therefore, if it is intended to cause the input R.P.M. to be changed moderately so as to prevent the shift shock, a long period of time is required until the input R.P.M. reaches the synchronous revolution speed of the gear stage to be established after the shift. In consequence, the time required for the shift is not necessarily shortened to an enough level and the shift shock can be prevented only in a limited manner.

SUMMARY OF THE INVENTION

It is therefore an object of the present invention to provide a shift control system capable of shortening a shifting time and executing a clutch-to-clutch shift without a shift shock.

It is another object of the present invention to provide a shift control system capable of rapidly executing a clutch-to-clutch shift by engaging a frictional engagement means on an applied side at a relatively earlier stage of the shift, and changing smoothly a torque appearing on an output shaft by bringing the frictional engagement means on both the applied and released sides into a so-called tie-up condition after the engagement of the frictional engagement means on the applied side proceeds to a sufficient level.

Accordingly, in accordance with the present invention, there is provided a shift control system for an automatic transmission including a first frictional engagement means and a second frictional engagement means, in which a given shift of the automatic transmission is conducted by decreasing an engaging force of the first frictional engagement means and increasing an engaging force of the second frictional engagement means. The shift control system according to the present invention comprises a low-pressure retention instructing means for maintaining the engaging force of the second frictional engagement means at a predetermined low level until a revolution speed of a rotary member reaches a predetermined value upon the shift; an engagement instructing means for increasing the engaging force of the second frictional engagement means after the revolution speed of the rotary member reaches the predetermined value; and a pressure rise-instructing means for increasing the engaging force of the first frictional engagement means after increasing the engaging force of the second frictional engagement means.

In a further preferred form of the present invention, the shift control system may further comprise a release instructing means for generating a command signal for decreasing the engaging force of the first frictional engagement means, which has been increased by the pressure rise instructing means, after a predetermined time has elapsed from the time at which the revolution speed of the rotary member reaches another predetermined value by increasing the engaging force of the second frictional engagement means.

In a still further preferred form of the present invention, the shift control system may further comprise a torque down instructing means for generating a command signal for reducing an output torque of an engine before the engaging force of the second frictional engagement means is increased by the engagement instructing means.

In the automatic transmission to which the shift control system according to the present invention is applicable, when a shift is conducted, the first frictional engagement means is released while the second frictional engagement means is applied. Namely, the engaging force of the first frictional engagement means is decreased while the engaging force of the second frictional engagement means is increased. In this case, the engaging force of the second frictional engagement means is maintained at a low level by the low pressure retention instructing means until a revolution speed of the rotary member reaches a predetermined value. Accordingly, change in the revolution speed of the rotary member, namely shift operation, is allowed to proceed rapidly. At the time when the revolution speed of the rotary member reaches the predetermined value, the engaging force of the second frictional engagement means is increased by the engagement instructing means. The engaging force of the second frictional engagement means is increased, for example, to a level at which a sufficient resistance to a torque applied after completion of the shift can be obtained. In association with the increase in the engaging force of the second frictional engagement means, when the revolution speed of the rotary member reaches another predetermined value, the engaging force of the first frictional engagement means is increased by the pressure rise instructing means. As a result, at this time, both the first and second frictional engagement means are brought into engagement, namely both are in a so-called tie-up condition, so that an output shaft torque is reduced or an abrupt change thereof is restricted. In consequence, the output shaft torque is moderately changed whereby the shift shock is lowered.

Thus, when a predetermined time has elapsed after the engaging force of the first frictional engagement means is increased, the release instructing means generates a command signal for reducing the engaging force of the first frictional engagement means so that the first frictional engagement means is substantially completely released, upon which the shift control is terminated.

Further, in the shift control system according to the present invention, before the engaging force of the second frictional engagement means is increased by the engagement instructing means, the torque down instructing means generates a command signal to reduce an output torque of the engine. This results in reduction of the input torque to the automatic transmission. Consequently, such a reduction of the engine torque can further lower the shift shock in conjunction with the aforementioned reduction of the output shaft torque due to the tie-up condition of both the frictional engagement means.

The above and further objects and novel feature of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 4 is a clutch/brake application chart for setting respective speed gear stages of the gear train shown in FIG. 3.

DESCRIPTION OF THE PREFERRED EMBODIMENTS

The preferred embodiment of the present invention will now described by referring to the accompanying drawings.

Figure 1:
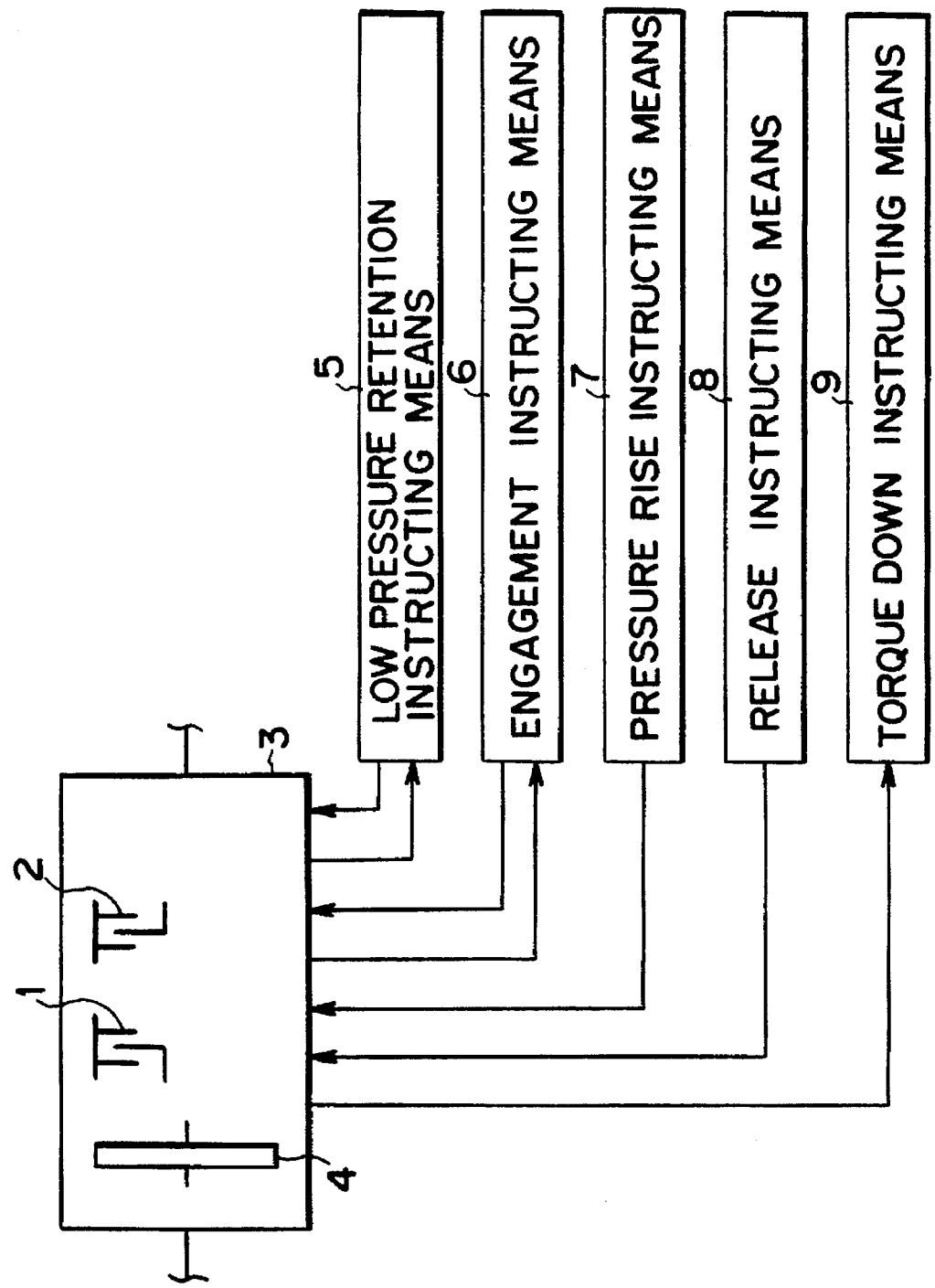
FIG. 1 is a block diagram showing a shift control system according to one preferred embodiment of the present invention by using functional means.

Referring to FIG. 1, there is shown a basic construction of a shift control system according to the present invention. The shift control system as shown in FIG. 1 performs a shift to a gear stage of the automatic transmission 3 by decreasing an engaging force of a first frictional engagement means 1 and increasing an engaging force of a second frictional engagement means 2. The sift control system for the automatic transmission 3, comprises a low pressure retention instructing means 5 for maintaining the engaging force of the second frictional engagement means 2 in a low level until a revolution speed of a rotary member 4 reaches a predetermined value upon the shift, an engagement instructing means 6 for increasing the engaging force of the second frictional engagement means 2 after the revolution speed of the rotary member 4 reaches the predetermined value, and pressure rise instructing means 7 for increasing the engaging force of the first frictional engagement means 1 after the engaging force of the second frictional engagement means 2 is increased.

In addition, the shift control system according to the present invention may further comprise a release instructing means 8 for generating a command signal for decreasing the engaging force of the first frictional engagement means 1 which has been increased by the pressure rise instructing means 7. The command signal is generated after a predetermined time has elapsed from the time at which the revolution speed of the rotary member 4 reaches another predetermined value after increasing the engaging force of the second frictional engagement means 2.

Moreover, the shift control system according to the present invention may further comprise a torque down instructing means 9 for generating a command signal for reducing an output torque of the engine before the engaging force of the second frictional engagement means 2 is increased by the engagement means 6.

As described above, in the automatic transmission 3 to which the shift control system according to the present invention is applicable, the shift between particular gear stages, for example the shift from the third speed gear stage and the second speed gear stage, is performed by releasing the first frictional engagement means 1 and applying the second frictional engagement means 2, such as a cluch, brake and the like. That is, the engaging force of the first frictional engagement means 1 is decreased while the engaging force of the second frictional engagement means 2 is increased. In this case, the engaging force of the second frictional engagement means 2 is maintained at a low level by the low pressure retention instructing means 5, until the revolution speed of the rotary member 4 reaches the predetermined value. Accordingly, the rotary member 4 rapidly causes change in its revolution speed, namely the shift from one gear stage to the other gear stage rapidly proceeds. When the revolution speed of the rotary member 4 reaches the predetermined value, the engaging force of the second frictional engagement means 2 is increased by the engagement instructing means 6. For instance, the engaging force of the second frictional engagement means 2 is raised to a level enough to bear against the torque applied after completion of the shift. Successively, when the revolution speed of the rotary member 4 reaches another predetermined value, the engaging force of the first frictional engagement means 1 is increased by the pressure rise instructing means 7. As a result, the first frictional engagement means 1 and the second frictional engagement means 2 are both brought into engaged condition, so that there occurs a so-called tie-up condition of these frictional engagement means whereby the output shaft torque is lowered or an abrupt change thereof is prevented. This leads to moderate change in the output shaft torque so that the shift shock is improved.

When the predetermined time has elapsed after the engaging force of the first frictional engagement means 1 is increased, the command signal for lowering the engaging force of the first frictional engagement means 1 is generated from the release instructing means 8 so that the first frictional engagement means 1 is substantially completely released, which results in termination of the control.

The shift control system may be further equipped with the torque down instructing means 9. In this case, before the engaging force of the second frictional engagement means 2 is increased by the engagement instructing means 6, the torque down instructing means 9 generates a command signal for reducing the output torque of the engine. As a result, the shift shock can be further lowered by the reduction of the input torque to the automatic transmission 3 in conjunction with the reduction of the output shaft torque due to the tie-up condition of the frictional engagement means.

Figure 2:
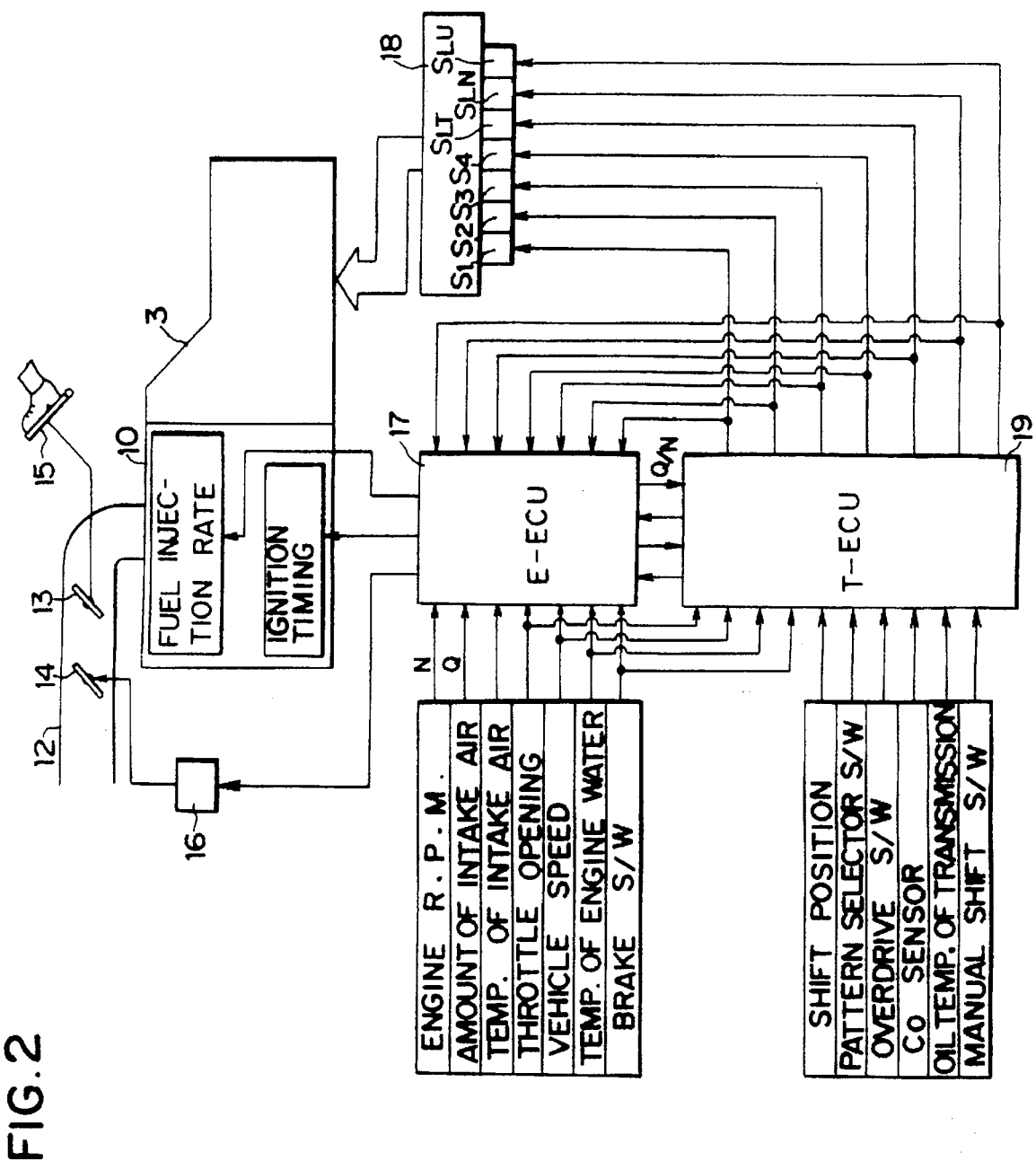
FIG. 2 is a block diagram schematically showing a control system according to the preferred embodiment of the present invention.

Here will be more specifically described the preferred embodiment of the present invention. In FIG. 2, an engine 10 connected to the automatic transmission 3 is equipped in its intake pipe 12 with a main throttle valve 13 and a sub-throttle valve 14 located upstream of the former. The main throttle valve 13 is so connected to an accelerator pedal 15 that it is controlled according to the depression of the accelerator pedal 15. On the other hand, the sub-throttle valve 14 is controlled by a motor 16. There is provided an engine electronic control unit (E-ECU) 17 for controlling the motor 16 to regulate the opening of the sub-throttle valve 14 and for controlling the fuel injection rate and the ignition timing of the engine 10. This electronic control unit 17 is composed mainly of a central processing unit (CPU), memory units (RAM and ROM) and an input/output interface and is fed as control data with a variety of signals including an engine (E/G) revolution speed (R.P.M.) N, an amount Q of intake air, a temperature of intake air, a throttle opening, a vehicle speed, a temperature of engine water and a brake switch.

In the automatic transmission 3, a hydraulic control unit 18 controls the shift, a lockup clutch, a line pressure and/or an engaging pressure of a predetermined frictional engagement means. The hydraulic control unit 18 is so constructed as to be electrically controlled and is equipped with: first to third shift solenoid valves S1 to S3 for executing the shift; a fourth solenoid valve S4 for controlling an engine braking state; a linear solenoid valve SLT for controlling the line pressure; a linear solenoid valve SLN for controlling an accumulator back pressure; and a linear solenoid valve SLU for controlling the engaging pressure of the lockup clutch or a predetermined frictional engagement means.

There is further provided an automatic transmission electronic control unit (T-ECU) 19 for controlling the shift, the line pressure and/or the accumulator back pressure by outputting signals to those solenoid valves. This electronic control unit 19 is composed mainly of a central processing unit (CPU), memory units (RAM and ROM) and an input/output interface and is fed as control data with the throttle opening, the vehicle speed, the engine water temperature, the brake switch signal, a shift position signal, a pattern select switch signal, an overdrive switch signal, a signal coming from a C0 sensor for detecting the R.P.M. of a later-described clutch C0, an oil temperature of the automatic transmission and a signal of a manual shift switch.

Moreover, the automatic transmission electronic control unit 19 and the engine electronic control unit 17 are connected with each other for data communications. Specifically, signals such as a signal of an amount (Q/N) of intake air per revolution are sent from the engine electronic control unit 17 to the automatic transmission electronic control unit 19, whereas signals such as a signal equivalent to a command signal for each solenoid valve or a signal for commanding a gear stage are sent from the automatic transmission electronic control unit 19 to the engine electronic control unit 17.

More specifically, the automatic transmission electronic control unit 19 decides the gear stage, the ON/OFF of the lockup clutch, or the regulated pressure level of the line pressure or the engaging pressure on the basis of the data inputted and the map stored in advance and outputs a command signal to a predetermined solenoid valve on the basis of the answer of the decision to decide a failure or performs a control based on the decision. On the other hand, the engine electronic control unit 17 not only controls the fuel injection rate, the ignition timing and/or the opening of the sub-throttle valve 14 on the basis of the data inputted but also lowers the output torque temporarily by reducing the fuel injection rate at the shifting time of the automatic transmission 3, by changing the ignition timing and/or by throttling the opening of the sub-throttle valve 14.

Figure 3:
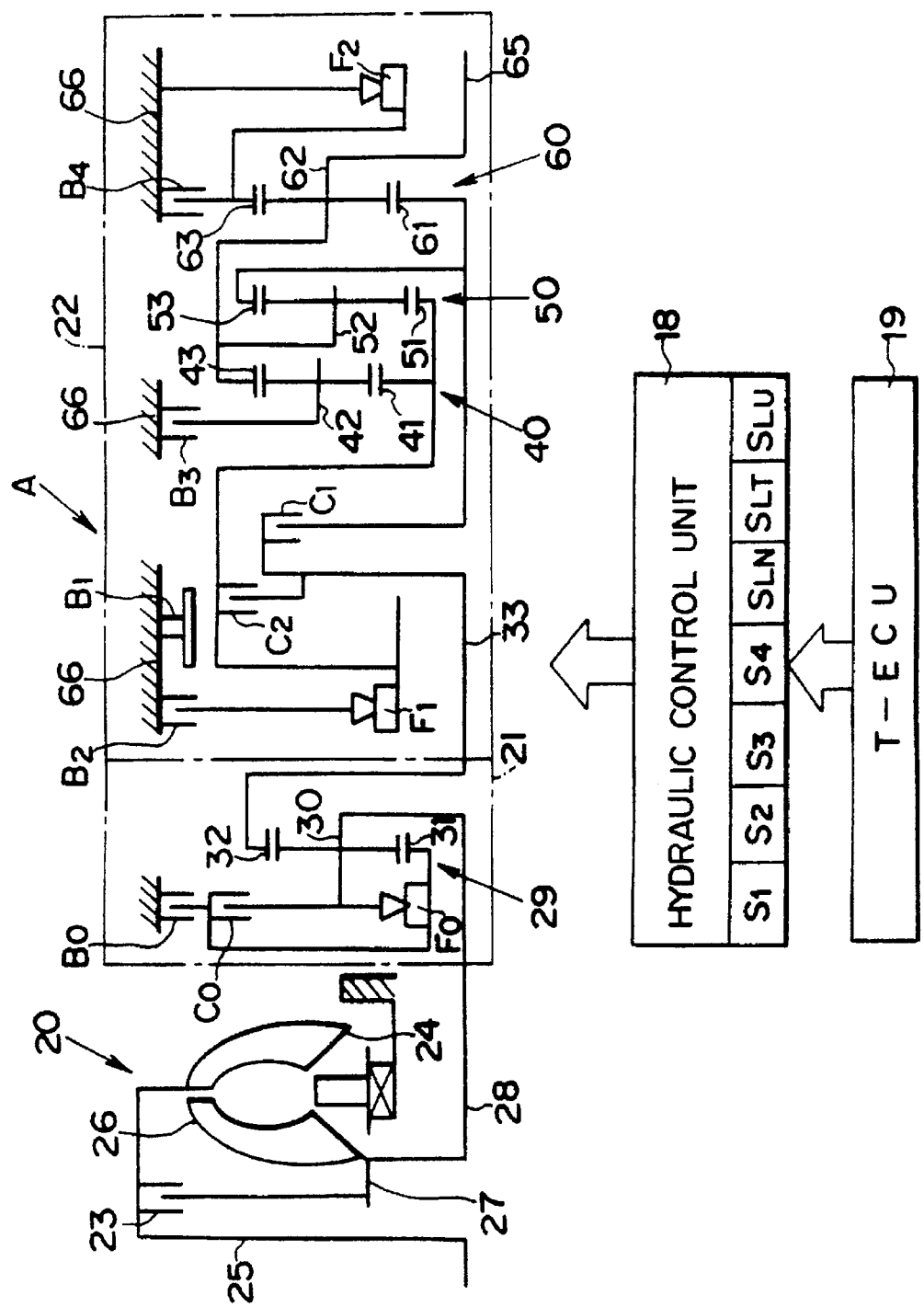
FIG. 3 is view showing mainly a gear train of an automatic transmission to which the shift control system according to the present invention is applicable.

FIG. 3 is a diagram showing one embodiment of the gear train of the automatic transmission 3 described above. As shown, the gear train is constructed to set five forward and one reverse gear stages. Specifically, the automatic transmission 3 is constructed of a torque converter 20, an auxiliary transmission unit 21 and a main transmission unit 22. The torque converter 20 is equipped with a lockup clutch 23 which is interposed between a front cover 25 integrated with a pump impeller 24 and a member (or hub) 27 integrated with a turbine runner 26. The engine has its crankshaft (although both are not shown) connected to the front cover 25, and an input shaft 28 having the turbine runner 26 connected thereto is connected to a carrier 30 of an overdrive planetary gear mechanism 29 constituting the auxiliary transmission unit 21.

Between the carrier 30 and a sun gear 31 of the planetary gear mechanism 29, there are interposed the multi-disc clutch C0 and a one-way clutch F0. Incidentally, this one-way clutch F0 is applied in case the sun gear 31 rotates forward (i.e., in the rotating direction of the input shaft 28)

relative to the carrier 30. There is also provided a multi-disc brake B0 for braking the rotation of the sun gear 31 selectively. Moreover, a ring gear 32 acting as the output element of the auxiliary transmission unit 21 is connected to an intermediate shaft 33 acting as the input element of the main transmission unit 22.

In the auxiliary transmission unit 21, therefore, the planetary gear mechanism 29 rotates as a whole with the multi-disc clutch C0 or the one-way clutch F0 being applied, so that the intermediate shaft 33 rotates at the same speed as that of the input shaft 28, thus establishing a lower gear stage. With the brake B0 being applied to stop the rotation of the sun gear 31, moreover, the ring gear 32 is accelerated with respect to the input shaft 28 to establish a higher gear stage.

On the other hand, the main transmission unit 22 is equipped with three sets of planetary gear mechanisms 40, 50 and 60, which have their individual rotary elements connected, as follows. Specifically, a sun gear 41 of the first planetary mechanism 40 and a sun gear 51 of the second planetary mechanism 50 are integrally connected to each other. Moreover, a ring gear 43 of the first planetary mechanism 40, a carrier 52 of the second planetary mechanism 50 and a carrier 62 of the third planetary mechanism 60 are connected to one another, and an output shaft 65 is connected to the carrier 62 of the third planetary mechanism 60. In addition, the second planetary mechanism 50 has its ring gear 53 connected to a sun gear 61 of the third planetary mechanism 60.

The gear train of this main transmission unit 22 can set one reverse and four forward gear stages and is composed of the following clutches and brakes for that settings. Of these, the clutches will be described at first. A first clutch C1 is interposed between a ring gear 53 of the second planetary mechanism 50 and the sun gear 61 of the third planetary mechanism 60, which are connected to each other, and the intermediate shaft 33. Moreover, the second clutch C2 is interposed between the sun gear 41 of the first planetary mechanism 40 and the sun gear 51 of the second planetary mechanism 50, which are connected to each other, and the intermediate shaft 33.

Here will be described the brakes. A first brake B1 is a band brake which is arranged to stop the rotations of the sun gears 41 and 51 of the first and second planetary mechanisms 40 and 50. Between these sun gears 41 and 51 (i.e., the common sun gear shaft) and a casing 66, there are arrayed in series a first one-way clutch F1 and a second brake B2 which is a multi-disc brake. Of these, the first one-way clutch F1 is applied when the sun gears 41 and 51 are to rotate backward (of the opposite rotating direction of the input shaft 28). A third brake B3 which is a multi-disc brake is interposed between a carrier 42 of the first planetary mechanism 40 and the casing 66. Between a ring gear 63 of the third planetary mechanism 60 and the casing 66, there are arranged in parallel a fourth brake B4 which is a multi-disc brake for braking the rotation of the ring gear 63 and a second one-way clutch F2. Incidentally, this second one-way clutch F2 is applied when the ring gear 63 is to rotate backward.

The automatic transmission 3 thus far described can set five forward and one reverse gear stages by applying/releasing the individual clutches and brakes, as tabulated in the clutch/brake application chart of FIG. 4. In FIG. 4: symbols ○ indicate the applied state; symbols ● indicate the applied state to be taken at the time of engine braking; symbols Δ indicate the applied or released state; and blanks indicate the released state.

As tabulated in the clutch/brake application chart of FIG. 4, the shifts between the 2nd speed and the 3rd speed are effected by the clutch-to-clutch shifts in which both the application and release of the second brake B2 and the third brake B3 are changed together. In order to smoothen these shifts, a hydraulic circuit shown in FIG. 5 is incorporated into the aforementioned hydraulic control unit 18.

Figure 5:
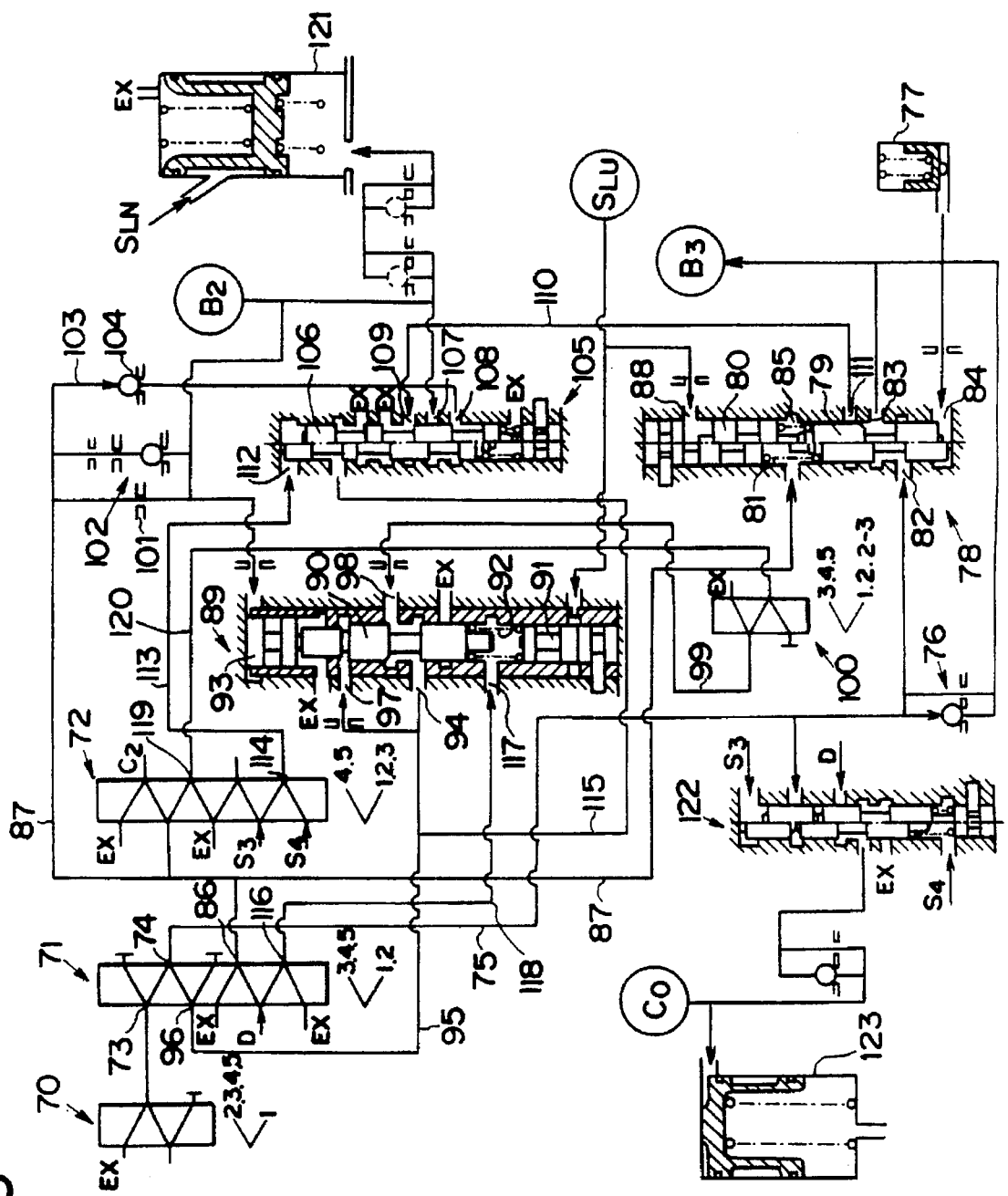
FIG. 5 is a view showing a part of a hydraulic circuit of the shift control system according to the present invention.

In FIG. 5: reference numeral 70 designates a 1-2 shift valve; numeral 71 designates a 2-3 shift valve; and numeral 72 designates a 3-4 shift valve. These shift valves 70, 71 and 72 have their individual ports opened to have communications at the individual gear stages, as respectively enumerated below themselves. Incidentally, the numerals indicate the individual gear stages. Of the ports of the 2-3 shift valve 71, a brake port 74 to communicate with an input port 73 at the 1st and 2nd speeds is connected to the third brake B3 via an oil passage 75. This oil passage 75 is equipped with an orifice 76, and a damper valve 77 is connected between the orifice 76 and the third brake B3. The damper valve 77 sucks the oil pressure a little to perform its damping action in case the third brake B3 is abruptly fed with the line pressure.

Reference numeral 78 designates a B-3 control valve for controlling the engaging pressure of the third brake B3 directly. Specifically, the B-3 control valve 78 is equipped with a spool 79, a plunger 80 and a spring 81 sandwiched between the former two. An input port 82 to be connected by the spool 79 is connected to the oil passage 75, and an output port 83 to be selectively caused to communicate with the input port 82 is connected to the third brake B3. The output port 83 is further connected to a feedback port 84 which is formed at the side of the leading end of the spool 79. On the other hand, a port 85 opened into a portion, in which the aforementioned spring 81 is arranged, is made to communicate with such one 86 of the ports of the 2-3 shift valve 71 via an oil passage 87 as outputs a D-range pressure at a 3rd or higher speed gear stage. Moreover, a control port 88 formed at the side of the end portion of the plunger 80 is connected with the lockup clutch linear solenoid valve SLU.

As a result, the B-3 control valve 78 has its regulated pressure level set by the elastic force of the spring 81 and the oil pressure fed to the port 85. In this case, the higher the signal pressure is fed to the control port 88, the larger the elastic force of the spring 81 becomes.

In addition, reference numeral 89 appearing in FIG. 5 designates a 2-3 timing valve which is constructed to include: a spool 90 formed with one radially smaller land and two radially larger lands; a first plunger 91; a spring 92 sandwiched between the former two; and a second plunger 93 arranged at the side opposed to the first plunger 91 across the spool 90. This 2-3 timing valve 89 has its intermediate port 94 connected to an oil passage 95, which in turn is connected to such a port 96 of the 2-3 shift valve 71 as is caused to communicate with such the brake port 74 at a 3rd or higher speed gear stage.

Moreover, the oil passage 95 is branched in its midway and connected through an orifice to a port 97 which is opened between the aforementioned smaller-diameter land and one of the larger-diameter lands. A port 98 to be selectively caused to communicate with the port 94 at the intermediate portion is connected through an oil passage 99 with a solenoid relay valve 100. Moreover, the lockup clutch linear solenoid valve SLU is connected to the port which is opened in the end portion of the first plunger 91, and the second brake B2 is connected through an orifice to the port which is opened in the end portion of the second plunger 93.

The aforementioned oil passage 87 is provided for applying/releasing the oil pressure to and from the second brake B2 and is equipped in its midway with a smaller-diameter orifice 101 and an orifice 102 having a check ball. From this oil passage 87, there is branched an oil passage 103 which is equipped with a larger-diameter orifice 104 having a check ball to be opened when the second brake B2 is to be released. The oil passage 103 is connected with an orifice control valve 105, as will be described in the following.

This orifice control valve 105 controls a rate of releasing the pressure from the second brake B2. This second brake B2 is connected to a port 107 which is so formed in an intermediate portion as can be opened or closed by a spool 106 of the orifice control valve 105. The aforementioned oil passage 103 is connected to a port 108 which is formed below that port 107, as shown. A port 109 is formed above the port 107 connected with the second brake B2, as shown, and is selectively caused to communicate with a drain port. To that port 109, there is connected through an oil passage 110 a port 111 of the aforementioned B-3 control valve 78. Incidentally, this port 111 is selectively caused to communicate to the output port 83 which is connected with the third brake B3.

Of the ports of the orifice control valve 105, a control port 112 formed at the end portion opposed to the spring for urging the spool 106 is connected to a port 114 of the 3–4 shift valve 72 through an oil passage 113. This port 114 outputs a signal pressure of the third solenoid valve S3 at a 3rd or lower speed gear stages and a signal pressure of the fourth solenoid valve S4 at a 4th or higher speed gear stage. With the orifice control valve 105, moreover, there is connected an oil passage 115 which is branched from the aforementioned oil passage 95 and which is selectively caused to communicate with the drain port.

Incidentally, in the aforementioned 2–3 shift valve 71, a port 116 for outputting a D-range pressure at a 2nd or lower speed gear stage is connected via an oil passage 118 to a port 117 which is opened in such a portion of the aforementioned 2–3 timing valve 89 as is arranged with the spring 92. In the 3–4 shift valve 72, moreover, a port 119, which is caused to communicate with the aforementioned oil passage 87 at a 3rd or lower speed gear stage, is connected through an oil passage 120 with the solenoid relay valve 100.

In FIG. 5, reference numeral 121 designates an accumulator for the second brake B2. A back pressure chamber of the accumulator 121 is supplied with an accumulator control pressure which is regulated on the basis of the oil pressure outputted by the linear solenoid valve SLN. Incidentally, the accumulator control pressure becomes higher as the output pressure of the linear solenoid valve SLN is reduced. Accordingly, in a transition region between application and release of the second brake B2, the oil pressure thereof is shifted to a higher level as the signal pressure of the linear solenoid valve SLN is reduced.

Moreover, reference numeral 122 designates a C-0 exhaust valve; and numeral 123 designates an accumulator for the clutch C0. Incidentally, the C-0 exhaust valve 122 applies the clutch C0 so as to effect the engine braking only at the 2nd speed in the 2nd speed range.

According to the hydraulic circuit thus far described, therefore, if the port 111 of the B-3 control valve 78 is in communication with the drain, the engaging pressure to be fed to the 3rd brake B3 can be directly regulated by the B-3 control valve 78, and its regulated pressure level can be varied by the linear solenoid valve SLU. If, on the other hand, the spool 106 of the orifice control valve 105 is in the position, as shown at the lefthand half in FIG. 5, the second brake B2 has communication with the oil passage 103 through that orifice control valve 105. As a result, the pressure can be released through the larger-diameter orifice 104 to control the rate of releasing the pressure from the second brake B2.

In the aforementioned automatic transmission, the 2nd brake B2 is released and the 3rd brake B3 is applied at the 2nd speed gear stage, and the 2nd brake B2 is applied and the 3rd brake B3 is released at the 3rd speed gear stage. In consequence, the shifts between the 2nd speed and the 3rd speed gear stages are effected by the clutch-to-clutch shifts in which both the 2nd brake B2 and the 3rd brake B3 are actuated together. In the shift control system according to the present invention, when the down shift from the 3rd speed to the 2nd speed is executed with the engine in power-on mode, the engaging pressures of the 2nd brake B2 and the 3rd brake B3 concerned in the shift are controlled in the following manner.

Figure 6:
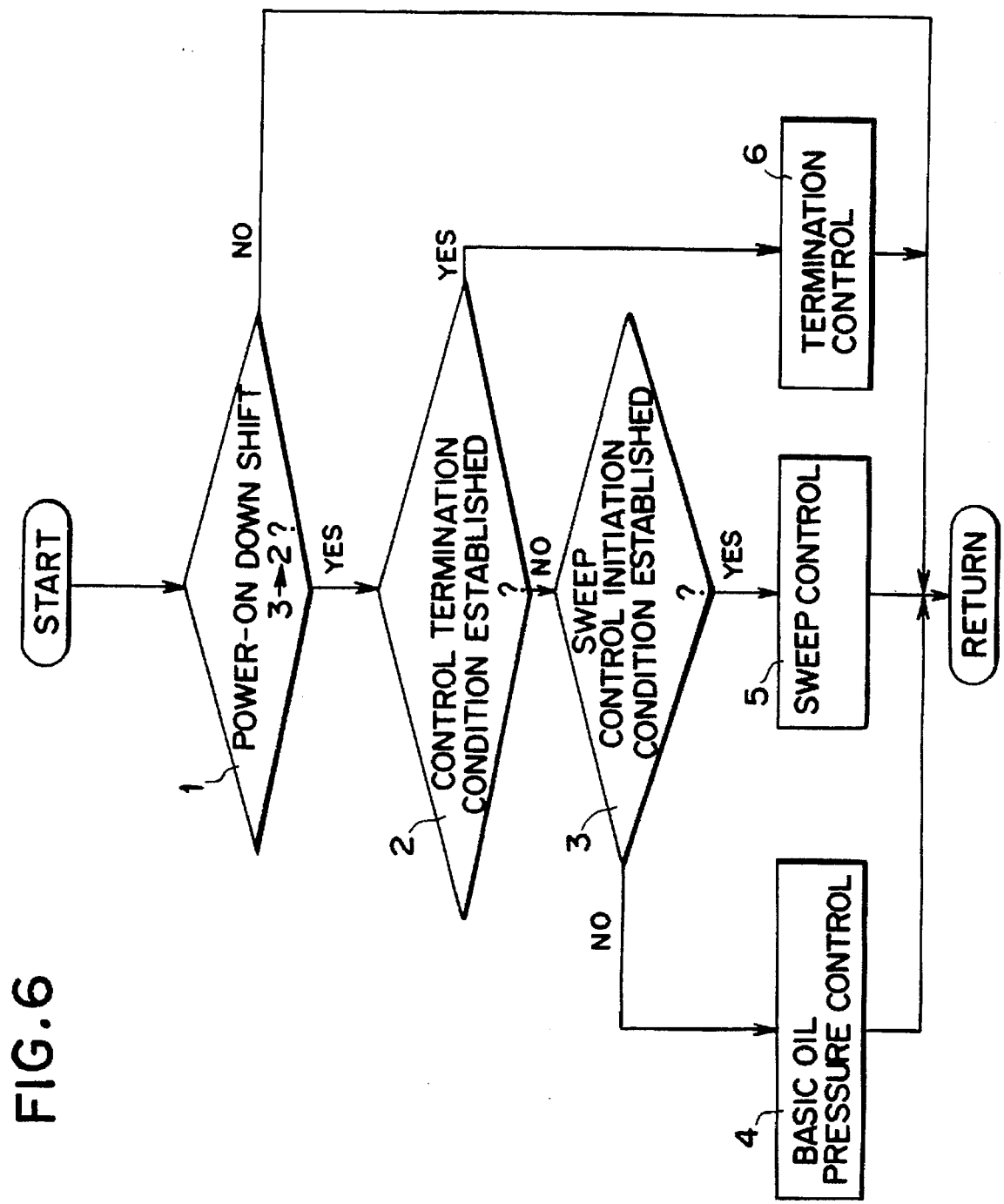
FIG. 6 is a flowchart schematically showing a control routine for executing a sweep control for an engaging pressure of a second brake on a released side upon a down shift from the third speed to the second speed.

FIG. 6 is a flowchart schematically showing a control routine according to the present invention.

In a step 1, a judgment of an initiation condition of the control is made as to whether or not a shift signal for the down shift from the 3rd speed to the 2nd speed is outputted. In case the judgment at the step 1 is "NO", namely in case the shift signal for the down shift is not outputted, any control is not executed and the control routine returns. To the contrary, in case the judgment at the step 1 is "YES", namely in case the shift signal for the down shift from 3rd speed to the 2nd speed is outputted, the control routine proceeds to a step 2 at which a judgment is made as to whether or not a control termination condition is established.

The control termination condition is that a predetermined time has elapsed from the time at which the input R.P.M. NC0 (revolution speed of the turbine or rotary members integrated with the turbine) reaches a value obtained by subtracting a predetermined revolution speed (for example 50 r.p.m.) from a synchronous revolution speed of the second speed gear stage (a value obtained by magnifying a revolution speed of the output shaft by a gear ratio of the second speed gear stage), or that a shift signal for the shift to a gear stage other than the 2nd speed gear stage is outputted. When the establishment of one of these conditions is judged, the control is terminated.

Incidentally, when the shift signal for the down shift from the 3rd speed to the 2nd speed is outputted, the 2–3 shift valve 71 is switched to communicate the port 73 with the brake port 74. Accordingly, the 3rd brake B3 is supplied with the oil pressure through the oil passage 75 and the orifice 76. The engaging pressure of the 3rd brake B3 is regulated by the B-3 control valve 78.

On the other hand, the oil passage 87 communicating with the 2nd brake B2 is caused to communicate with the drain through the port 86 so that the oil pressure is released from the 2nd brake B2. The transitional oil pressure of the 2nd brake B2 is controlled by the accumulator control valve 105. That is, the 3rd brake B3 is applied while regulating its engaging pressure, whereas the 2nd brake B2 is released while regulating its engaging pressure.

In case the judgment at the step 2 is "NO", namely in case the control termination condition is not established, the control routine proceeds to a step 3 at which a judgment is made as to whether or not a sweep control initiation condition is established. This sweep control is executed in such a manner that the engaging pressure of the 2nd brake B2, which functions as the frictional engagement means on the released side upon the down shift to the 2nd speed, is temporarily and gradually increased. Specifically, the sweep control is executed by changing a duty ratio of the linear solenoid valve SLN in a stepwise manner. In addition, the sweep control is executed immediately before completion of the down shift. Accordingly, the establishment of the sweep control initiation condition is judged either when the following items (1) and (2) are satisfied, or when the following items (1) and (3) are satisfied: (1) the vehicle speed is not higher than a predetermined value; (2) the input R.P.M. NC0 exceeds a value lower by a predetermined reference value than the synchronous revolution speed of the 2nd speed gear stage; and (3) a ratio of a difference between the input R.P.M. NC0 and the synchronous revolution speed to an increasing rate of the input R.P.M. NC0 is not higher than another predetermined reference value. Incidentally, these reference values are predetermined values mapped on the basis of parameters indicative of vehicle running conditions such as a vehicle speed, a throttle opening or the like.

In case the aforementioned sweep control initiation condition is not established, namely in case the judgment at the step 3 is "NO", the control routine proceeds to a step 4 at which a basic oil pressure control is executed. This basic oil pressure control is executed essentially to control the signal pressure of the linear solenoid valve SLN as is similar to the aforementioned sweep control. Accordingly, the engaging pressure of the 2nd brake B2 is finally controlled. Thus, the basic oil pressure control is executed when the aforementioned sweep control initiation condition is not established. Therefore, if the shift signal for the down shift from the 3rd speed to the 2nd speed is outputted, the basic oil pressure control is immediately executed whereby the signal pressure of the linear solenoid valve SLN is increased and the back pressure of the accumulator 121 for the second brake B2 is reduced to a predetermined constant pressure.

Accordingly, immediately after the shift signal for the down shift from the 3rd speed to the 2nd speed is outputted, the oil pressure of the 2nd brake B2 is released therefrom to reduce its engaging pressure, so that the engaging pressure of the 2nd brake B2 is maintained in a low level by the oil accumulated in the accumulator 121. On the other hand, the engaging pressure of the 3rd brake B3 is also maintained in a low level by lowering the regulated pressure level of the B-3 control valve 78, which in turn is accomplished by lowering the signal pressure fed from the linear solenoid valve SLN to the B-3 control valve 78. Since the engaging pressures of the 2nd brake B2 and the 3rd brake B3 are both maintained in the low levels, the input R.P.M. NC0 is abruptly increased whereby the down shift from the 3rd speed to the 2nd speed is allowed to proceed rapidly. The control for reducing the output torque of the engine is executed at such a terminal period of the inertia phase in which the revolution speed of the rotary member is varied. The control for reducing the engine output torque may be performed by such a method as delayed ignition timing or the like, as described above.

When the input R.P.M. NC0 is increased with the progress of the down shift, the engaging pressure of the 3rd brake B3 is also increased to a level enough to establish the 2nd speed gear stage. Specifically, the increase in the engaging pressure of the 3rd brake B3 is achieved by increasing the output pressure of the linear solenoid valve SLN and therefore raising the regulated pressure level of the B-3 control valve 78.

Accordingly, a function at the step 4 includes those provided by the low pressure retention instructing means, the torque down instructing means and the engagement instructing means according to the present invention.

When the sweep control initiation condition is established before or after the execution of the aforementioned basic oil pressure control, the control routine proceeds to a step 5 at which the sweep control is executed. Specifically, as the output pressure of the linear solenoid valve SLN is reduced stepwise, the back pressure of the accumulator 121 for the 2nd brake B2 is increased stepwise. Incidentally, at that time, since the 3rd solenoid valve S3 generates the signal pressure, the control port 112 of the orifice control valve 105 is supplied with the oil pressure, so that the port 107 communicating with the 2nd brake B2 is closed and the oil pressure of the 2nd brake B2 is released through the small orifices 101 and 102.

Accordingly, an amount of oil discharged from the accumulator 121 is increased as the back pressure of the accumulator 121 is increased. At the time when the oil amount discharged from the accumulator 121 becomes larger than an oil amount drained through the orifices 101 and 102, the engaging pressure of the 2nd brake B2 starts to be increased. In the shift control system according to the present invention, the engaging pressure of the 2nd brake B2 is gradually increased almost simultaneously with or immediately after the time at which the engaging pressure of the 3rd brake B3 is increased in the aforementioned manner. Accordingly, the function of the step 5 corresponds to that provided by the pressure rise instructing means.

Thus, by increasing the engaging pressure of the 2nd brake B2, both the 2nd brake B2 and the 3rd brake B3 have a torque capacity (namely the torque is received by both the brakes) so that a so-called tie-up condition occurs whereby the output shaft torque is reduced. Specifically, since the 3rd brake B3 for setting the 2nd speed gear stage is almost completely applied, there is a tendency that the output shaft torque is rapidly increased to a level corresponding to the gear ratio of the 2nd speed gear stage. At that time, the 2nd brake B2, however, receives a portion of the torque transmitted to the output shaft so that an abrupt rise up of the output shaft torque is restricted.

In the course of the aforementioned sweep control, more specifically when a predetermined time has elapsed from the time at which the input R.P.M. NC0 reaches the predetermined revolution speed after increasing the engaging pressure of the 2nd brake B2, the 3rd solenoid valve S3 generates the signal pressure to change over the orifice control valve 105. That is, the port 107 is allowed to communicate with the port 108 so that the 2nd brake B2 is in communication with the oil passage 103 having the large-diameter orifice 104. Accordingly, since the back pressure of the accumulator 121 is gradually increased and an orifice area of a drain passage from the 2nd brake B2 is expanded, the engaging pressure of the 2nd brake B2 is maintained at a slightly increased level so that the aforementioned tie-up condition is maintained. Incidentally, the signal pressure of the linear solenoid valve SLN is increased up to a predetermined pressure and thereafter maintained at that pressure.

When the output torque is slowly increased and the predetermined time has elapsed from the time at which the input R.P.M. NC0 approaches the synchronous revolution speed of the 2nd speed gear stage, the aforementioned control termination condition is established. As a result, since the judgment at the step 3 is "YES", the control routine proceeds to a step 6 at which a termination control is executed. Specifically, the linear solenoid valve SLN is controlled on the basis of a control routine other than the aforementioned control routine, so that the 2nd brake B2 is released. Accordingly, the function of the step 6 corresponds to that provided by the release instructing means.

Incidentally, the torque down control for the engine is followed by a torque restoration control which serves for returning the reduced engine torque to its inherent state and is executed when the predetermined time has elapsed after the input R.P.M. NC0 is increased to the predetermined revolution speed, so that the control variable of the torque down control becomes zero within a predetermined period of time.

Figure 7:
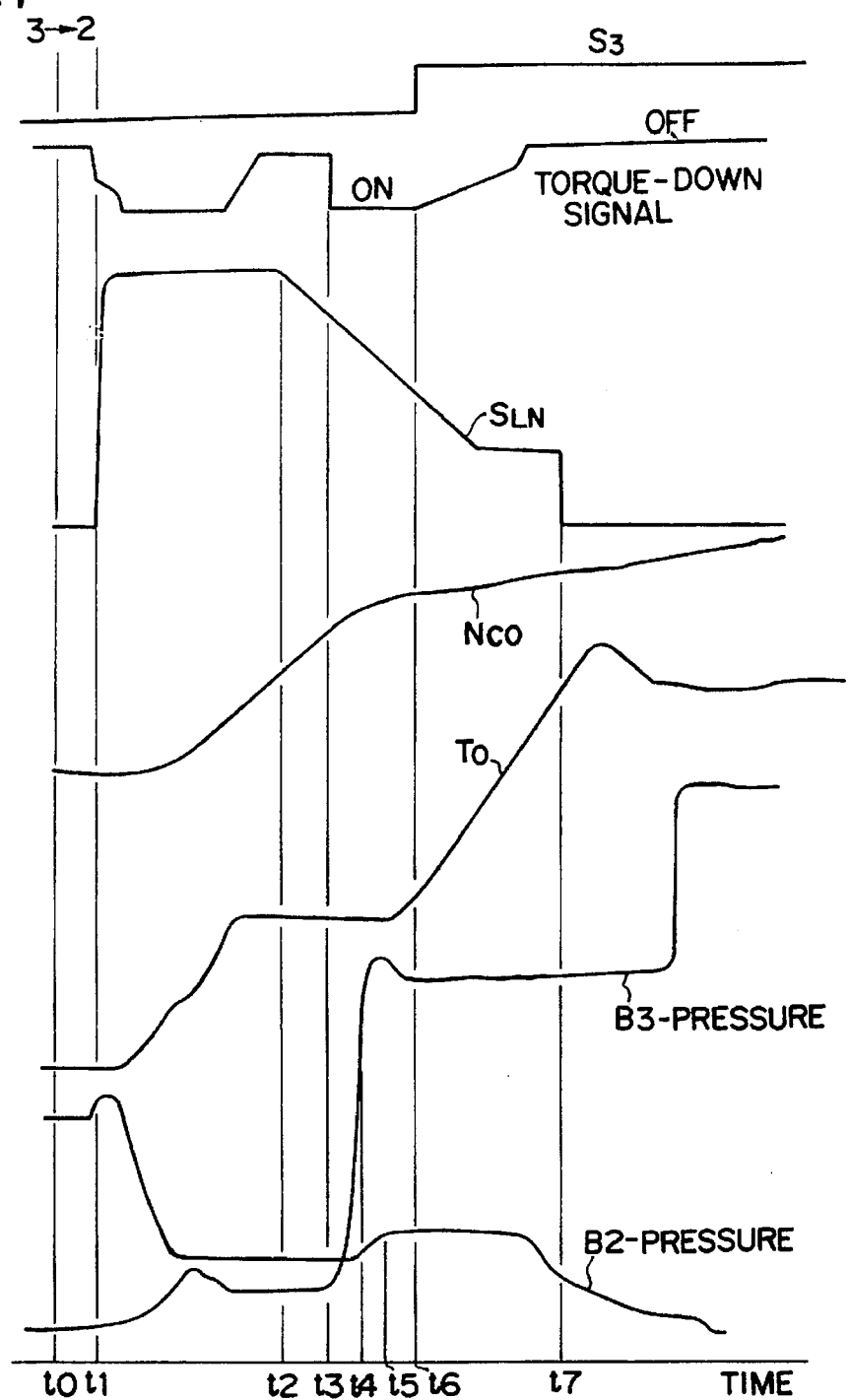
FIG. 7 is a time chart for the above down shift.

The aforementioned control routine is explained by referring to a time chart shown in FIG. 7. At the time t0, the judgment of the shift from the 3rd speed to the 2nd speed is established. At the time t1 when a predetermined time has elapsed from the time t0, a shift signal indicative of the down shift is generated. The outputted shift signal causes the 2–3 shift valve 71 to be switched so that the oil pressure of the 2nd brake B2 is released to reduce the engaging pressure thereof, whereas the 3rd brake B3 is supplied with the oil pressure to increase its engaging pressure up to a low pressure stand-by level. By setting both the engaging pressures of the 2nd and 3rd brakes B2 and B3 to a low level, the input R.P.M. NC0 starts to be gradually increased so that the output shaft torque T0 is also increased gradually.

On the other hand, the aforementioned basic oil pressure control of the linear solenoid valve SLN is executed to set the engaging pressure of the 2nd brake B2 to the predetermined low level. That is, the control variable thereof is maintained at the predetermined level.

At the time t2 at which the aforementioned sweep control initiation condition is established due to the increase of the input R.P.M. NC0, the sweep control of the linear solenoid valve SLN starts and is executed such that a control variable (duty ratio) thereof is varied in a stepwise manner.

When the input R.P.M. NC0 is increased and approaches the synchronous revolution speed of the 2nd speed gear stage, the torque down control is performed (at the time t3). At the time t4 immediately after the time t3, the engaging pressure of the 3rd brake B3 is increased to a level at which the 3rd brake B3 is almost completely applied. With the increase in the engaging pressure of the 3rd brake B3, the output shaft torque T0 starts to be increased. In addition, the sweep control of the linear solenoid valve SLN causes the engaging pressure of the 2nd brake B2 to be increased (at the time t5) so that the engaging pressure of the 2nd brake B2 is maintained at a predetermined increased level. As a result, moderate increase of the output torque T0 occurs.

At the time t6 in the course of the moderate increase of the output torque T0, the torque restoration control is initiated and the output of the signal pressure from the 3rd solenoid valve S3 is interrupted. At the time t7 at which the control termination condition is established, the sweep control of the linear solenoid valve SLN is terminated, so that the 2nd brake B2 is rapidly released.

Here will be described a mutual relation between the respective oil pressures in the aforementioned control routine. At the time t0, the engaging pressure (B3-pressure) of the 3rd brake B3 is much lower than the engaging pressure (B2-pressure) of the 2nd brake B2. Subsequent to the time t1, the B3-pressure is gradually increased while the B2-pressure is gradually decreased. At the time t2, the B2-pressure is still maintained at a level slightly higher than the B3-pressure. Further, at the time t6, the B2-pressure is set at a level slightly higher than the B2-pressure at the time t2 but lower than the B2-pressure at the time t0, and the B3-pressure is set at a level higher than the B2 pressure at the time t0.

Accordingly, in the aforementioned shift control system according to the present invention, after the output of the shift signal, the shift proceeds rapidly while maintaining the 2nd and 3rd brakes B2 and B3 at a low engaging level, so that a delay in the shift operation or a slow response based thereon can be beforehand prevented. When the shift operation further proceeds and the engaging pressure of the 3rd brake B3 on the applied side is increased to a higher level, the engaging pressure of the 2nd brake B2 on the released side is increased for a predetermined period of time. As a result, the increase in the output shaft torque becomes moderate so that the shift shock is lowered. In addition, since the torque down control for the engine is performed together, a tendency of increase in the output shaft torque is further reduced whereby the shift shock is more effectively prevented.

Figure 8:
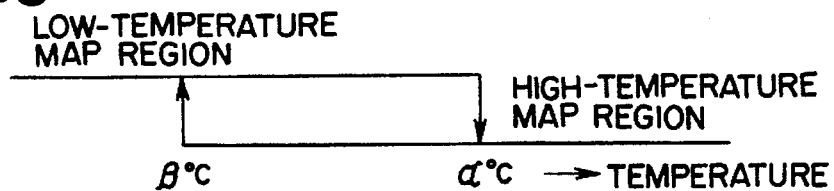
FIG. 8 is a view schematically showing temperature regions for a high-temperature map and a low-temperature map.

Incidentally, applying and releasing rates of the frictional engagement means such as the aforementioned 2nd and 3rd brakes B2 and B3 are affected by supplying and discharging rates of the oil, and a flow rate of the oil is affected by its viscosity. Accordingly, there occurs a difference in the applying and releasing rates (timing) of the frictional engagement means between a high-viscosity state and a low-viscosity state of the oil. In consequence, it is suitable that the control variables for the aforementioned control are selectively picked up from a high-temperature map and a low-temperature map both prepared depending upon temperature conditions of the control system. In this case, as shown in FIG. 8, it is preferable that the low-temperature map be used until the engine water temperature and the oil temperature are increased up to a predetermined reference temperature $\alpha°C$. when these temperatures are in the course of temperature-rise, whereas the high-temperature map be used until the engine water temperature and the oil temperature are decreased to a predetermined reference temperature $\beta°C$. when these temperatures are in the course of a temperature-drop. Thus, when such a hysteresis is provided for these reference temperatures at which the maps are switched, occurrence of hunting phenomenon is effectively prevented.

Although the down shift from the 3rd speed to the 2nd speed is illustrated in the aforementioned embodiment, the present invention is not restricted to the particular shift operation but applicable to the other clutch-to-clutch shifts in a similar manner. In addition, in the aforementioned embodiment, the engaging pressure of the 2nd brake B2 on the released side is increased by sweep-controlling the linear solenoid valve SLN. However, the similar effect can be achieved by using various means, if desired, to increase the engaging pressure of the frictional engagement means on the release side. For example, the line pressure may be increased for this purpose. Namely, this invention is not restricted to the above mentioned embodiment. Moreover, the present invention can be applied to automatic transmissions having gear trains or hydraulic circuits other than those illustrated in FIGS. 3 and 5, or to control systems therefor. In addition, the rotary members used to detect the input R.P.M. is not restricted to those which are caused to rotate at the same revolution speed as the input R.P.M.

Here will be generally described advantages of the present invention. In the shift control system according to the present invention, an engaging force of one frictional engagement means on the applied side is maintained at a low level in an initial stage of the control and is then increased to a higher level. Thereafter, the engaging force of the other frictional engagement means on the released side is increased. As a result, the shift operation can proceed rapidly, and occurrence of a delay in the shift operation or a slow response due to the delay of the shift operation can be beforehand prevented. In addition, since the output shaft torque is moderately increased, occurrence of the shift shock is effectively prevented.

Particularly, when the torque down control of the engine is executed before the engaging force of the frictional engagement means on the applied side is increased to a higher level, fluctuation of the output shaft torque becomes more moderate whereby the shift shock can be more effectively prevented.

What is claimed is:

1. A shift control system for an automatic transmission which has a first frictional engagement means and a second frictional engagement means, in which a shift of the automatic transmission is carried out by decreasing an engaging force of said first frictional engagement means and increasing an engaging force of said second frictional engagement means, comprising:

a low pressure retention instructing means for maintaining the engaging force of said second frictional engagement means at a predetermined low level until a revolution speed of a rotary member reaches a predetermined value upon the shift;

an engagement instructing means for increasing the engaging force of said second frictional engagement means after the revolution speed of said rotary member reaches said predetermined value; and a pressure rise instructing means for increasing the engaging force of said first frictional engagement means after increasing the engaging force of said second frictional engagement means.

2. The shift control system according to claim 1, further comprising a release instructing means for generating a command signal for decreasing the engaging force of said first frictional engagement means, which has been increased by said pressure rise instructing means, after a predetermined time has elapsed from the time at which the revolution speed of said rotary member reaches another predetermined value by increasing the engaging force of said second frictional engagement means.

3. The shift control system according to claim 1, further comprising a torque down instructing means for generating a command signal for reducing an output torque of an engine before the engaging force of said second frictional engagement means is increased by said engagement instructing means.

4. The shift control system according to claim 1, wherein said low pressure retention instructing means includes a means for maintaining the engaging force of said second frictional engagement means at a level at which the revolution speed of said rotary member is changed to that of a gear stage to be established after the shift.

5. The shift control system according to claim 1, wherein said engagement instructing means includes a means for increasing the engaging force of said second frictional engagement means when a difference between the revolution speed of said rotary member and a value obtained by multiplying a revolution speed of an output shaft of the automatic transmission by a gear ratio of a gear stage to be established after the shift, is not more than a predetermined reference value.

6. The shift control system according to claim 1, wherein said engagement instructing means includes a means for increasing the engaging force of said second frictional engagement means when a ratio of a difference between the detected revolution speed of said rotary member and a revolution speed of a gear stage to be established after the shift, to a changing rate of the revolution speed of said rotary member is not more than a predetermined reference value.

7. The shift control system according to claim 1, wherein said engagement instructing means includes a means for increasing the engaging force of said second frictional engagement means to a level enough to establish a gear stage after the shift.

8. The shift control system according to claim 1, wherein said pressure rise instructing means includes a means for increasing the engaging force of said first frictional engagement means up to a level at which an increase in output torque of the automatic transmission is prohibited.

* * * * *